May 18, 1937. J. L. TAYLOR 2,080,939
BALANCING MACHINE
Filed Aug. 28, 1933 3 Sheets-Sheet 1
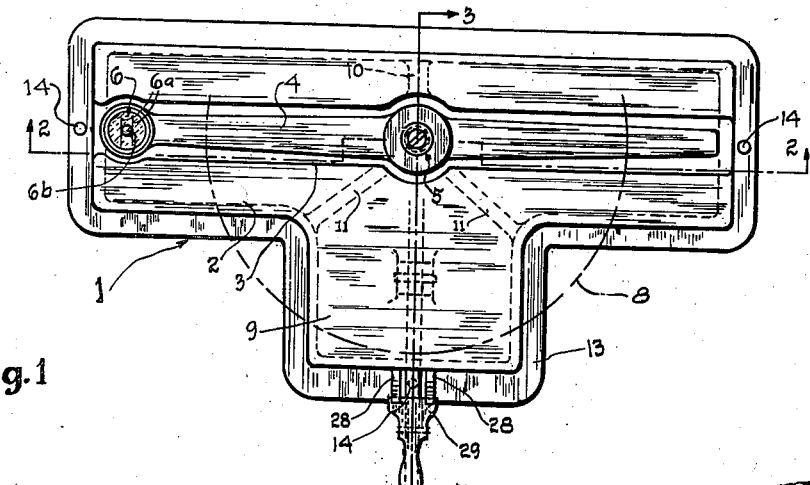
Fig.1
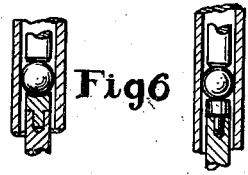
Fig.6
Fig.7
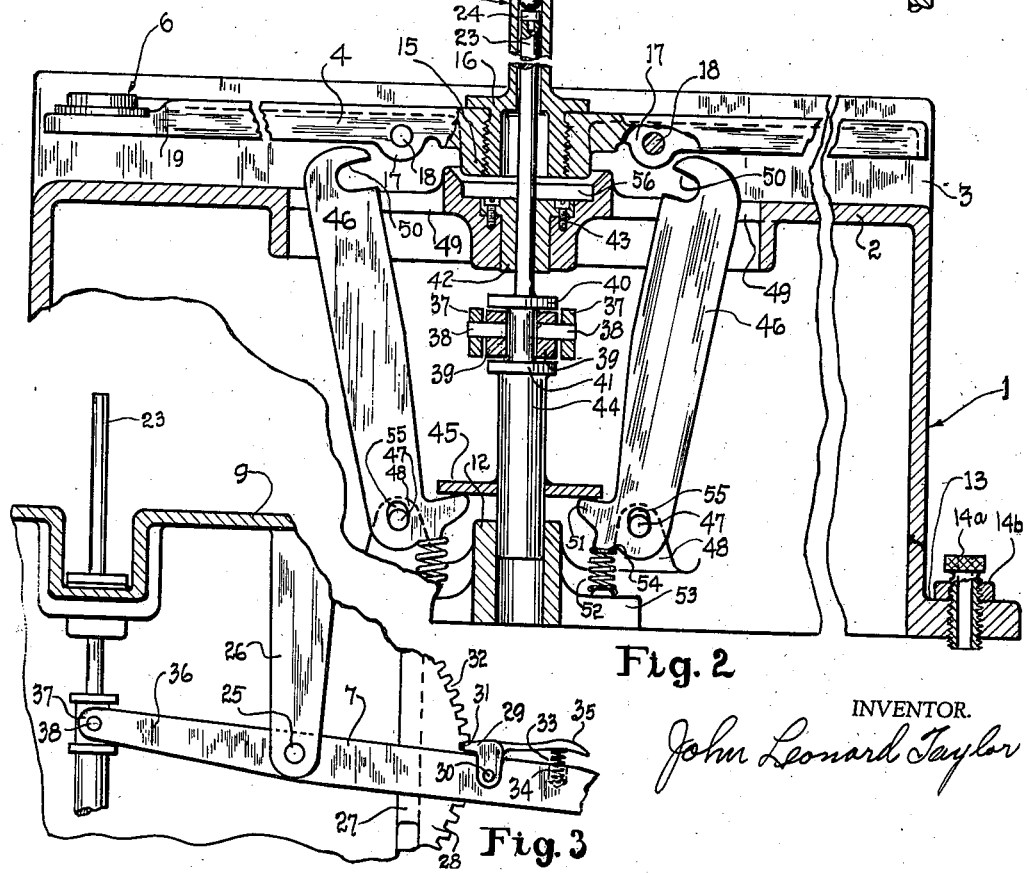
Fig. 2
Fig. 3
INVENTOR.
John Leonard Taylor

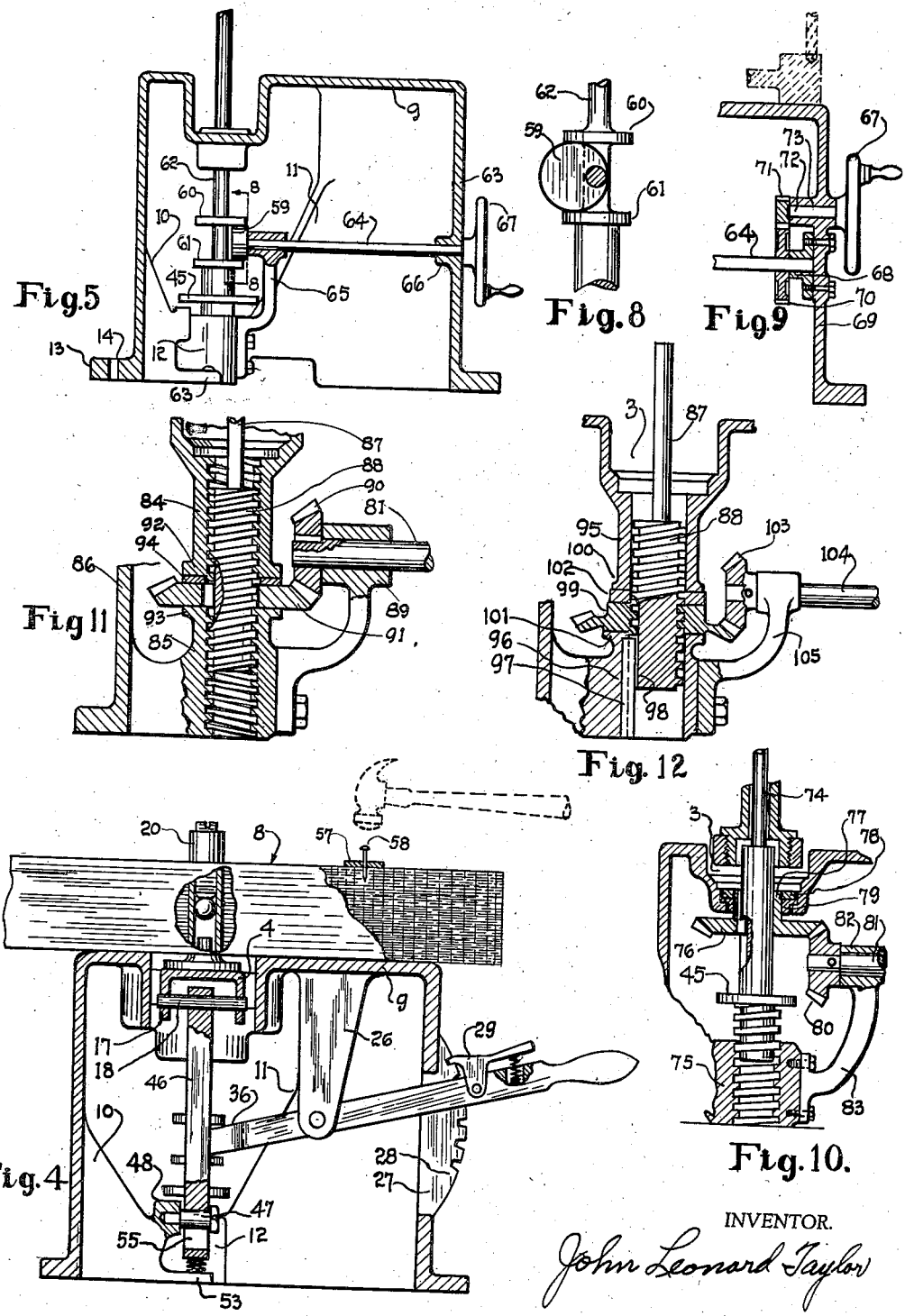

Patented May 18, 1937

2,080,939

UNITED STATES PATENT OFFICE 2,080,939

BALANCING MACHINE

John Leonard Taylor, Milwaukee, Wis.

Application August 28, 1933, Serial No. 687,096

8 Claims. (Cl. 73—51)

The present invention relates to balancing machines, and the present application is a continuation in part of co-pending application of John L. Taylor, Serial Number 645,675, filed December 5, 1932, and an object of the invention is to generally improve the construction and operation of devices of this class.

A further object is to provide such a device which will operate with increased speed and certainty.

More particularly, an object of the invention is to provide a device for accurately balancing machine parts and the like which are intended to be accurately dynamically symmetrical.

A further object is to provide such a device which will indicate immediately approximately where a part is too heavy.

A further object is to provide such a device having a tilting support member to which a work piece may be attached.

A further object is to provide such a support which is constituted to tilt when carrying a work piece which is not accurately balanced.

A further object is to provide means for supporting a work piece independently of said tilting support, without removing said work piece from said support.

A further object is to provide for moving said means and said work piece into mutually engaged and disengaged relation.

A further object is to provide such a machine having a body portion upon which a work piece may rest when it is not being tested, and from which it may be raised for testing.

A further object is to provide a fulcrum for said tilting support which may be raised to lift said support and said work piece clear of said body portion, and lowered to deposit said work piece upon said body portion.

A further object is to provide means for so raising and lowering said fulcrum.

A further object is to provide for positively maintaining said tilting support in its lowered position whereby to facilitate removal of a work piece therefrom.

A further object is to provide for holding a work piece firmly when lowered whereby a balancing operation such as adding or subtracting material may be performed thereon.

A further object is to provide for positively lowering said fulcrum when desired.

A further object is to provide for accurately centering said tilting support on said fulcrum.

A further object is to provide for removing said fulcrum from contact with said tilting support whereby shocks to which said body portion is subjected will be prevented from damaging the fulcrum bearing.

A further object is to provide for determining the amount that a work piece is out of balance.

A further object is to provide for positively securing a work piece to said support.

Further objects and advantages will become apparent from the following specification and annexed drawings in which:

Fig. 1 is a plan view of a machine embodying the invention.

Fig. 2 is a fragmentary vertical sectional view of the same machine taken substantially on the line 2—2 of Fig. 1, and somewhat enlarged.

Fig. 3 is a fragmentary vertical sectional view taken substantially on the line 3—3 of Fig. 1 and enlarged.

Fig. 4 is a similar view showing the parts in a different position, and illustrating certain other details.

Fig. 5 is a view similar to Fig. 4 but showing a modified construction for raising a post.

Figs. 6 and 7 are sectional details of types of fulcrum bearing adaptable to the invention.

Fig. 8 is a sectional view on the line 8—8 of Fig. 5.

Fig. 9 is a view of a portion of Fig. 5 showing a modified construction.

Fig. 10 is a fragmentary sectional view substantially on the line 3—3 of Fig. 1 showing a further modified mechanism for raising the post.

Figs. 11 and 12 are similar views showing variations of the structure shown in Fig. 10.

Figure 14:
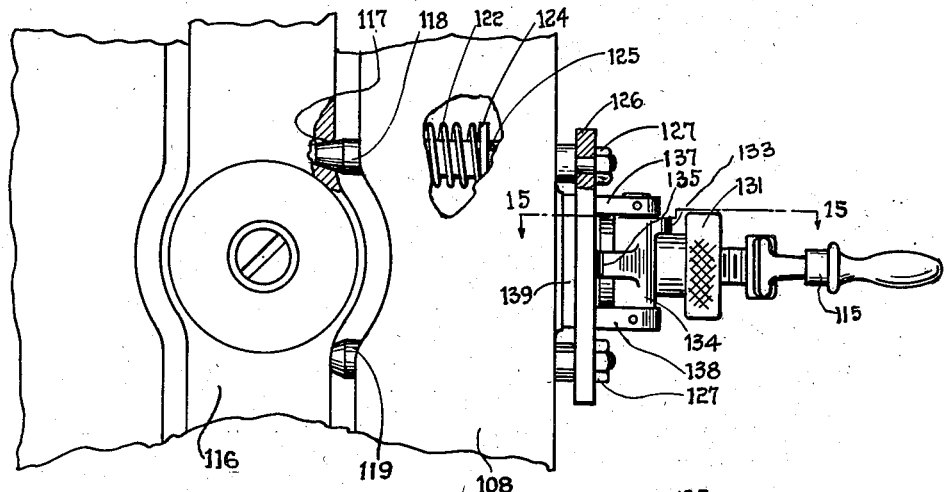
Fig. 14 is a fragmentary plan view of the same machine.

The machine as seen in Fig. 1 comprises a base or body portion generically designated by numeral 1, having a raised portion 2 provided with a channel 3 in which is disposed a beam, carrier or support member 4. The beam or carrier is supported for tilting movement on a fulcrum bearing of suitable type generically designated by numeral 5 and more particularly shown in Fig. 2, tilting of the beam being detected or indicated by means of a universal spirit level 6 or other suitable device. Beam or carrier 4 may be raised out of channel 3 or lowered therein in the present instance by raising or lowering fulcrum bearing 5 by suitable means such as a lever 7 more particularly shown in Fig. 3, the carrier when lowered depositing a work piece 8 upon raised portion 2 of base 1, the base being also provided with an extension 9 particularly adapted to support the work piece while a balancing operation is performed thereon, such for example, as nailing a weight thereto as suggested in Fig. 4. Obviously support or pad 9 would serve equally well to support a work piece while removing material therefrom by drilling or the like as suggested in Fig. 9 for the purpose of balancing, and it is to be understood that the invention is not to be taken as limited to the use of the pad for nailing, or in fact, in any manner except as defined by the subjoined claims.

Base 1, as particularly seen in Figs. 1, 4, and 5 in the present instance is a box like structure generally T shape as seen in plan and has suitable webs 10 and 11—11 for generally stiffening the structure and for carrying a guide or foot bearing 12, the purpose of which will appear presently. Web 10 extends inwardly from the back wall of the raised portion 2, and webs 11—11 extend rearwardly diagonally approximately from the juncture of the pad portion 9 with the main body portion 2 as suggested by the dotted lines in Fig. 1. A flange 13 may be provided at the lower extremity of base 1 and openings 14—14 or other suitable means provided thereon for fastening the machine to a bench or other suitable support. If desired, an adjustable leveling screw or bushing 14a may be provided for vertical adjustment in flange 13, openings 14 being threaded for the purpose, the bushing being locked at a desired position by a jam nut 14b. The hole through bushing 14a is provided to receive a conventional clamping or hold down bolt. This arrangement has been found extremely desirable in that it eliminates the necessity for the engagement of clamps or other holding means with other parts of the balancer which would induce strains in the supporting base causing deflection thereof which in turn would prevent accurate positioning of the members supported by said base and adversely affect the accuracy of the balancer.

Beam 4 in the present instance is an elongated member, channel shaped in cross section as shown more particularly in Fig. 2, disposed with its open side down, and having a boss 15 on its under side suitably apertured to receive a sleeve 16 forming part of above mentioned fulcrum bearing 5. Spaced slightly on either side of boss 15 the beam has downwardly extending ears 17—17 carrying pins 18—18 disposed transversely slightly below the body of the beam in the present instance, and serving to retain the beam in its lowermost position under certain conditions. At one end the beam is provided with a depressed portion or pad 19 on which level 6 is attached.

Fulcrum bearing 5 is of a type similar to that described and claimed in the above mentioned co-pending application and comprising above mentioned sleeve 16 which in the present instance is threaded into boss 15 and has an upstanding tubular mandrel or support 20 in which is threaded an adjusting or abutment screw 21 engaging a bearing element or ball 22 which in the present instance is snugly slidable in mandrel 20 whereby it is always accurately centered therein while capable of readily shifting its axial or rotated position. The bearing may thus present new wearing surfaces from time to time which it will do without attention whenever screw 21 is adjusted. The ball, however, preferably fits in the mandrel tightly enough so that it will be supported therein by frictional engagement with the mandrel when the mandrel is raised as seen particularly in Figs. 4 and 13. Ball 22 rests on a post or support 23 which in the present instance is substantially vertically movable relatively to base 1 and supported therefrom, an insert or bearing member 24 of extreme hardness, substantially in excess of ball 22, being interposed between post 23 and ball 22 as by brazing, soldering or the like whereby the post need not be made entirely of material suitable for such a bearing. It is entirely within the scope of the present invention to omit the insert 24 and let ball 22 bear directly on post 23 when desired. Insert 24 or post 23 preferably presents a flat surface to ball 22, but it is contemplated that any degree of curvature either concave or convex may be used within the scope of the invention if found desirable. Such construction is suggested in Figs. 6 and 7.

As indicated in Fig. 2 there is a fairly generous clearance between the interior of mandrel 20 and post 23, and beam 4 may accordingly tilt freely about the point of contact between ball 22 and insert 24 to the extent permitted by the clearance. When a work piece such as 8 is placed on mandrel 20, screw 21 is adjusted so that the pivot or point of contact is at or slightly above the plane of the center of gravity of the combined mass of the work piece and the beam 4, this being determined by adjusting the screw up and down until a point is found where a slight lowering will render the beam unstable with a work piece thereon that is known to be balanced. The screw is then raised just sufficiently so that the beam and its load will come to rest in a substantially level position. The fulcrum is then correctly located for other work pieces of the same character and thickness.

Level 6 as above stated is preferably a spirit level capable of indicating tilting in any direction, but other expedients are contemplated as equivalent, and the invention is not to be considered as limited to this construction or in any manner except as defined by the claims.

For convenience in judging the direction of tilting of beam 4 it is contemplated that spaced parallel lines 6a—6a may be provided on level 6 preferably spaced a distance equal to the width of the bubble 6b, the lines extending in the direction parallel to the radius of the work piece 8 into which it is desired to swing the unbalanced weight of the work piece for treatment. By comparing the position of the bubble with the lines it may be readily determined whether the tilting observed is exactly in the plane of the desired radius or slightly to one side or the other thereof, and the position of the piece changed accordingly.

Lever 7 as particularly shown in Figs. 3 and 4 is fulcrumed on a pin or the like 25 fixed with a downwardly extending bracket 26 carried in the present instance by pad 9, the lever extending out of the base through a slot 27 flanked by a sector or a pair of sectors 28—28 arranged to cooperate with a latch or detent 29. The detent is pivoted on the lever at 30 and has a tongue portion 31 engaging notches or the like 32 in sectors 28 and serving to hold the lever in various desired positions. A spring 33, preferably received in a bore 34 in lever 7 acts between the lever and a handle portion 35 of latch 29 and yieldably maintains the tongue 31 in the desired notch. The lever at its inner end has a forked portion 36 terminating in a pair of ears 37—37 having inwardly extending pins 38—38 on which are suitably journaled blocks 39—39 engaged between collars 40 and 41 fixed with post 23. Movement of the lever causes rising and falling of the post, and sliding of the blocks between the collars permits the arcuate movement of the forked portion of the lever without interference from the rectilinear movement of the post.

Post 23 is guided in the present instance in a bushing 42 removably fixed in a bore in the bottom of recess 3, and held therein by suitable means such as screws 43—43, the post having an enlarged portion 44 below collars 40 and 41 guided in above mentioned bearing 12. Near its lower end portion 44 has suitably fixed therewith in the present instance a collar or disk 45 for actuating certain mechanism for holding down beam 4.

For this purpose in the illustrated embodiment a pair of similar hook members 46—46 is provided, fulcrumed on pins 47—47 fixed with suitable bosses or the like 48—48 extended from web 10, the hooks extending upwardly through openings 49—49 in the lower wall of recess 3 and having cam surfaces 50—50 arranged for engagement with above described pins 18—18 upon inward swinging movement of the hooks. Each hook member has a tongue 51 extending inwardly adjacent pin 47 as seen in Fig. 2 into the path of movement of disk 45, and is urged upwardly by a spring 52 acting between a pad 53 extended from bearing 12 and a seat 54 formed on the hook member between pin 47 and tongue 51. Each hook member is provided with a slot 55 where it engages its respective pin 47, whereby a certain amount of longitudinal movement of the hook is permitted in addition to the above mentioned swinging movement.

Upon first engagement of disk 45 with tongues 51, the springs will keep the hooks in their uppermost positions and the hooks will pivot about pins 47 until cam surfaces 50 engage pins 18. Further downward movement of disk 45, pivoting movement of the hooks being prevented by such engagement, will cause bodily downward movement of the hooks, the hooks carrying with them the beam 4 by virtue of the engagement between pins 18 and hooks 46. In the device as illustrated work piece 8 contacts portion 9 at about the point where disk 45 encounters tongues 51, and beam 4 will ordinarily be supported during downward movement of post 23 by frictional engagement of the mandrel 20 with the work piece. The bodily downward movement of the hooks 46, however, pulls the beam down in spite of this resistance, thereby forcing the work piece into fairly intimate contact with base 1.

Approximately at the point in the downward travel of post 23 where disk 45 engages tongues 51, boss 15 enters a recess 56 in the lower wall of recess 3 the movement of the post as well as actuating the hooks 46 removing insert 24 from contact with ball 22. The action of the hooks 46 holds the carrier or beam firmly down in the recess so that considerable force may be exerted on mandrel 20 when applying a work piece thereto without danger of damaging the ball 22 or insert 24. In this position of the parts considerable force may be exerted when necessary to remove a work piece from mandrel 20 without the beam 4 lifting off the machine as would be the case without the hooks.

A further function is performed by recess 56 in centering beam 4 accurately on post 23. Since in the preferred embodiment insert 24 is flat, it has no tendency to locate ball 22 with respect to the longitudinal axis of post 23, and the beam might easily become displaced from its correct position relative to the post. If mandrel 20 were located eccentrically relatively to post 23 it would not be free to tilt in all directions and dependable indications of unbalance in a work piece would be impossible. Boss 15 in the present instance fits snugly in recess 56 when beam 4 is lowered, and mandrel 20 takes its position from the beam, the parts being proportioned so that upon the next upward movement of the post, ball 22 will be accurately centered on post 23 and the clearance within mandrel 20 will be symmetrically disposed about the post when the carrier is level.

The present machine is particularly adapted to the requirements of balancing polishing wheels, buffing wheels, and the like, although of course other types of work may be balanced on it and the invention is not limited to use with any specific class of work, but is intended to be used in any manner within the scope of the claims. In Fig. 4 an instance is shown of the balancing of a cloth wheel, the parts being shown in their lowermost position. In practice the work piece 8 is forced into position on mandrel 20 while carrier or beam 4 is locked in its lowermost position as above described by hooks 46—46. The nature of the work causes a relatively firm frictional engagement between it and mandrel 20, and the force necessary to position the work piece is taken on boss 15 and not upon ball 22 as above described. When the wheel is in position the post 23 is raised by means of lever 7, the initial upward movement of the post disengaging hooks 46 as will be understood, and further movement raising carrier 4 and its load, and disengaging boss 15 from recess 56. The carrier is now free to tilt and if the wheel 8 is unbalanced the carrier will tilt toward the heavy portion of the wheel, and the direction of such tilting will be indicated by level 6.

The operator now places a weight 57 and a fastening means such as a nail 58 on the upper side of the wheel and tries it in various locations until he finds one which will cause the carrier and its load to come to rest in a level position. The carrier is then lowered and locked in its lowermost position whereupon wheel 8 may be rotated on mandrel 20 until the weight 57 is over the nailing pad 9, when the nail may be driven home and the weight fastened to the wheel in the exact position determined by the balancing process. If desired the post 23 may be again raised and the balance rechecked before removing the wheel from the machine, the post 23 being again lowered and the carrier held down by hooks 46 so that the wheel may be pulled off the mandrel. As above noted post 23 is removed from contact with ball 22 during the nailing operation so that shocks received by the base 1 are not transmitted to the fulcrum bearing and do not damage the surfaces.

It is to be noted that, owing to the locking of the carrier by hooks 46 the wheel 8 is firmly held down on pad 9 by means of friction from mandrel 20 while the nailing is taking place, thereby facilitating the nailing operation. The same would be true if some other method of balancing were practiced. Thus if metal objects were being balanced pad 9 could be used to support the objects while small amounts of material were removed therefrom by means of a drill or the like, the locking of the carrier serving to prevent shifting of the work while the drilling was being accomplished.

Although a lever has been shown connected for raising and lowering post 23 it is to be understood that other means are contemplated for this purpose within the scope of the present invention. In Figs. 5 and 8 an arrangement is shown wherein a cam 59 is interposed between collars 60 and 61 fixed with a post 62 similar to above mentioned post 23, the post being guided for vertical movement in a base 63 substantially similar to base 1. Cam 59 is fixed in the present instance with a shaft 64 carried in a bearing 65 suitably fixed in base 63 as by fastening to bearing 12 as shown, and in a bearing 66 fixed with a wall of base 63. A hand wheel or other manually operable control member 67 is fixed with shaft 64 externally of base 63 by means of which cam 59 may be rotated for raising and lowering the post. As in the first described embodiment, disk 45 operates hooks 46 and in all other respects the machine is identical with that of Figs. 1, 2, and 4.

In machines intended for use with relatively large and heavy work pieces, or for other reasons, it would prove desirable in certain instances to provide a reduction gear between hand wheel 67 and cam 59, and a typical arrangement of this character is shown in Fig. 9. Shaft 64 is shortened somewhat and its end remote from cam 59 is carried in a suitable bearing 68 fixed with the base member 69. The shaft is driven by means of a gear 70 fixed therewith and driven in turn from a gear 71 fixed with a short shaft 72 carried in a bearing 73 fixed with base 69 and carrying hand wheel 67. Rotation of the hand wheel accordingly causes rotation of shaft 64 at a reduced rate, thus multiplying the torque in shaft 64 and permitting the lifting of heavier work pieces than would be possible in the previous embodiments.

Other expedients are contemplated for raising the fulcrum post, and in Fig. 10 is shown an arrangement in which the post 74 is threaded where it enters a foot bearing 75 corresponding to above mentioned bearing 12. In this arrangement a bevel gear 76 is slidably keyed with post 74 and has an upwardly extending sleeve portion 77 retained by means of a suitable collar 78 in a bushing 79 carried in the lower wall of recess 3. Gear 76 is driven by a gear 80 meshing therewith and fixed with a shaft 81 journaled in a bearing 82 carried in the present instance by a bracket 83 fixed with bearing 75, shaft 81 extending forwardly to a suitable point for actuation after the manner of shaft 64 described above, or in any suitable manner. As in the case of the previously described embodiments, a disk 45 actuates hooks such as 46 when the post approaches its lowermost position. The type of fulcrum bearing used, namely ball 22 resting on insert 24 permits rotation of the post during raising or lowering thereof without deleterious results.

Variations of the above structure are shown in Figs. 11 and 12 whereby a greater range of movement may be given the post than is possible in the Fig. 10 embodiment, particularly where it is not desired to operate hooks or the like such as 46 from the post. In Fig. 11 aligned internally threaded guides 84 and 85 are supported within the base 86, and the post 87 has an enlarged threaded portion 88 complementary to the guides and traveling when rotated from one to the other. Portion 88 may be rotated from a shaft 81 which may be identical with shaft 81 in Fig. 10, the shaft being journaled in a bearing 89 and having fixed therewith a bevel gear 90 driving a bevel gear 91 slidably keyed to portion 88 and received between thrust portions 92 and 93 respectively on guides 84 and 85, a washer 94 being interposed between the gear and thrust portion 92 to permit assembly of the parts. Rotation of shaft 81 will cause rotation and rising or falling of post 87.

A further variation of this idea is shown in Fig. 12 in which post 87 travels in smoothly bored guides 95 and 96, guide 96 being provided with a key 97 engaging a keyway 98 in portion 88, a bevel gear 99 being threaded internally and engaging portion 88 between thrust portions 100 and 101 respectively on guides 95 and 96. As in the above case a washer 102 permits assembly of the parts, and gear 99 is driven by a gear 103 fixed with a shaft 104 carried in a bearing 105 fixed in the present instance with guide 96. Shaft 104 may be driven in any suitable manner and rotation thereof will cause rotation of gear 99 and raising or lowering of post 87, the post in this instance moving vertically without rotating. The threads in the last three embodiments may be of any suitable type, but preferably are of a character which will serve as a guiding means as well as an elevating means for the post. Various forms of threads are capable of performing this function and it is contemplated to use any of these which may prove most convenient.

Figure 15:
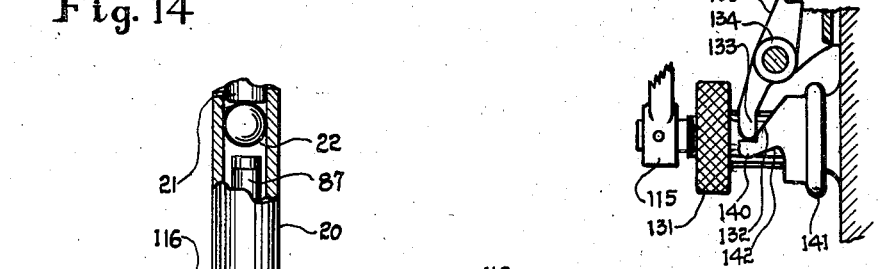
Fig. 15 is a fragmentary sectional view taken on the line 15—15 of Fig. 14.
Figure 13:
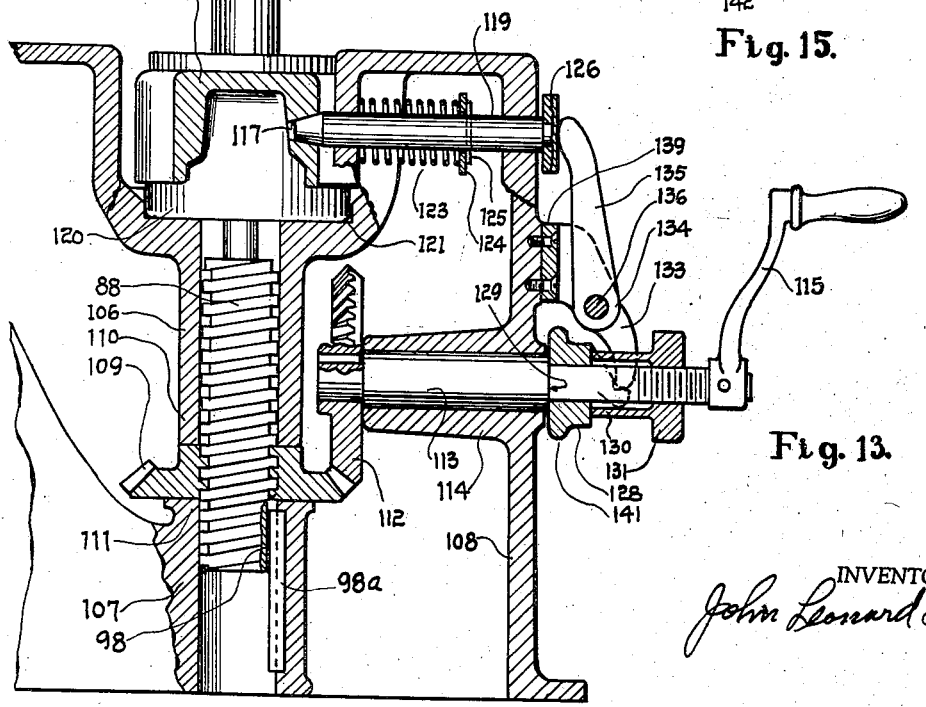
Fig. 13 is a vertical sectional view of a machine involving a mechanism for locking a balancing beam or cradle, particularly applicable to the embodiments shown in Figs. 11 and 12.

Variations are contemplated in the manner of locking the beam or cradle in its lowered position and an arrangement particularly adaptable for the types of post disclosed in Figs. 11 and 12 is shown in Figs. 13, 14, and 15. In this embodiment a post or column 87 substantially identical with that of Fig. 12 is used, the same having an enlarged threaded portion 88, provided with a keyway 98 engaged with a key 98a to prevent rotation of the column the threaded portion 88 traveling up and down in smoothly bored guides 106 and 107 supported in aligned relation in a base or body portion 108. A bevel gear or nut portion 109, internally threaded, is engaged with portion 88, and disposed between thrust portions 110 and 111 respectively on guide portions 106 and 107. Rotation of the gear will accordingly cause rising and falling of the post, and such rotation may be accomplished by a gear 112 fixed with a shaft 113 carried in a suitable bearing 114 fixed with base 108 and rotated by means of a crank or the like 115 fixed with the shaft outside of base 108.

Column 87 carries a hollow mandrel 20 supported thereon in the same manner as mandrel 20 of Fig. 2, the mandrel being fixed with and carrying a beam or cradle 116 similar to beam 4, but having suitable, preferably tapered sockets 117—117 therein spaced axially of the beam at either side of mandrel 20. Sockets 117 are spaced to register when beam 116 is in its lowermost position with locking pins 118 and 119 slidable in base 108 and provided with suitable end portions to fit sockets 117 when urged thereinto, and serving when so positioned to hold a hub or boss portion 120 of beam 116 down into a supporting and centering recess 121, whereby a work piece may be applied to or removed from mandrel 20 without danger of damaging the fulcrum bearing as above described, and whereby the mandrel is correctly centered over the column for the next upward movement thereof.

Pins 118 and 119 are urged outwardly from engagement with beam 116 by means of springs 122 and 123 in the present instance surrounding the pins within base 108 as shown and acting between a wall thereof and washers 124—124, bearing in turn against pins 125—125 fixed in suitable bores in pins 118 and 119. Pins 118 and 119 are connected for simultaneous movement by a plate 126 exteriorly of base 108 fixed with the pins in any suitable manner as for example, by nuts 127—127, and suitable mechanism is provided for forcing the plate and pins inwardly from movement of shaft 113 as follows:

Shaft 113 has journaled thereon a cam member 128 which may be clamped therewith between a shoulder 129 on the shaft and a sleeve portion 130 of a nut 131 threaded on the shaft. Cam member as more particularly shown in Fig. 15 has a lift portion 132 extending forwardly outside of sleeve 130 and actuating after a predetermined amount of rotation of shaft 113 a finger 133 depending from a hub or bearing portion 134 of a lever arm 135 extending upwardly and engaging plate 126. The action of lift portion 132 forces finger 133 to the left as shown in Fig. 15, or to the right as shown in Fig. 14, thus moving lever arm 135 to the left in the latter figure, and forcing pins 118 and 119 into sockets 117—117 against the resistance of springs 122 and 123. Hub portion 134 is journaled on a pin 136 supported in any suitable manner above shaft 113 as for example, in ears 137 and 138 extending from a member 139 fixed with base 108. If desired a stop portion 140 may be formed on lift portion 132 to prevent rotation of shaft 113 beyond the point at which pins 118 and 119 are engaged with beam 116.

Cam member 128 is adjustable on shaft 113 to provide for operation of pins 118 and 119 at various positions in the travel of post or column 87, thereby permitting a minimum of movement of the column from balancing position to locked position and vice versa. Thus work pieces of different thickness and other characteristics require different adjustments of the ball fulcrum 22 as above explained, and a considerable range of movement is therefore given to column 87 in each case. Only a small part of this possible movement is necessary on a given work piece, however, and in the present instance a movement corresponding to substantially one complete turn of gear 109 is sufficient. In setting up the machine for a given type of work piece, nut 131 is loosened so that cam 128 is loose on the shaft and does not actuate lever 135. The column 87 is then raised by rotating crank 115 to a point just under that at which it will commence to lift beam 116. Cam 131 is turned by means of its grip portion 141 into the position where it causes engagement of pins 118 and 119 with beam 116, and is clamped in this position by tightening nut 131. Rotation of shaft 113 by means of crank 115 in a clockwise direction as viewed from the front of the machine first causes disengagement of pins 118 and 119, while at the same time raising the column into contact with ball fulcrum 22. Subsequent movement of the crank raises the column and cradle sufficiently to lift the work piece clear of the top of base 108 for testing purposes, the movement of the crank being finally arrested in the present instance by engagement of a stop portion 142 on lift portion 132 with finger 133.

From the above description it will be clear that a machine has been devised on which work pieces may be quickly checked for balance, and upon which correction for unbalance may be performed without removing the work piece from the machine, and that while the machine is extraordinarily sensitive, the parts are so well protected that work such as nailing may be performed on the machine without danger to the parts upon which the machine depends for such sensitiveness.

What is claimed as new, and desired to be secured by Letters Patent of the United States is:

1. In a balancing machine the combination of a body portion, a fulcrum post carried by said body portion, extending substantially vertically therefrom, and supported for vertical movement relatively thereto, means for causing such vertical movement of said post, a carrier constituted to receive a work piece to be balanced, a fulcrum bearing carried by said carrier and operative to support said carrier for tilting movement relatively to said post, means on said body portion positioned to receive said work piece when said post is lowered, interengaging portions on said body portion and carrier operative when said post is lowered to center said carrier about said post, a hook member on said body portion movable into engagement with said carrier to prevent upward movement thereof and consequent disengagement of said interengaging portions, resilient means arranged to urge said hook away from engagement with said carrier, said hook having a projection, and said post having a flange, said projection being positioned in the path of downward movement of said flange, and arranged when contacted by said flange to force said hook into engagement with said carrier, and said post and said interengaging parts being so proportioned that said fulcrum bearing is relieved of load when said hook is engaged with said carrier.

2. In a balancing machine the combination of a body portion, a fulcrum post carried by said body portion, extending substantially vertically therefrom, and supported for vertical movement relatively thereto, means for causing such vertical movement of said post, a work carrier fulcrumed on said post and constituted to receive a work piece to be balanced, means mounted on said body portion and engageable with said carrier for preventing upward movement thereof, and a support on said body portion positioned to receive and support said work piece when said post is lowered, said carrier and said body portion having interengaging portions operative when said post is lowered to center said carrier about said post.

3. In a balancing machine the combination of a body portion, a fulcrum post carried by said body portion, extending substantially vertically therefrom, and supported for vertical movement relatively thereto, means for causing such vertical movement of said post, a carrier constituted to receive a work piece to be balanced, and fulcrumed on said post for tilting movement relatively thereto, interengaging portions on said body portion and carrier operative to center said carrier about said post upon downward movement thereof, and mechanism actuated by movement of said post and operative upon downward movement thereof to engage said carrier to maintain said interengaging portions in engagement and to prevent upward movement of said carrier.

4. In a balancing machine the combination of a body portion, a fulcrum post carried by said body portion, extending substantially vertically therefrom, and supported for vertical movement relatively thereto, means for causing such vertical movement of said post, a work carrier fulcrumed on said post and constituted to receive a work piece to be balanced, and a nailing pad on said body portion positioned to engage and directly support said work piece independently of said work carrier when said post is lowered.

5. In a balancing machine the combination of a body portion, a fulcrum post carried by said body portion, extending substantially vertically therefrom, and supported for vertical movement relatively thereto, means for causing such vertical movement of said post, a work carrier fulcrumed on said post and constituted to receive a work piece to be balanced, said means including a movable shaft, a cam movable with said shaft, a locking pin engageable between said body portion and said work carrier, and arranged to prevent upward movement of said carrier when so engaged, and connections actuated by said cam when said shaft is moved to lower said post, and operative to engage said pin between said body portion and said carrier.

6. In a balancing machine the combination of a body portion, a fulcrum post carried by said body portion, extending substantially vertically therefrom, and supported for vertical movement relatively thereto, a carrier fulcrumed on said post for tilting movement relatively thereto and constituted to receive a work piece to be balanced, means mounted on said body portion and actuated by downward movement of said post into engagement with said carrier for preventing upward movement thereof, a manually operable element carried by said body portion, and connections from said element arranged to raise said post when said element is actuated in one direction, and to prevent actuation of said element in the other direction without lowering said post.

7. In a balancing machine the combination of a body portion, a fulcrum post carried by said body portion, extending substantially vertically therefrom, and supported for vertical movement relatively thereto, a carrier fulcrumed on said post for tilting movement relatively thereto and constituted to receive a work-piece to be balanced, a manually operable element carried by said body portion, connections from said element arranged to raise said post when said element is actuated in one direction, means mounted on said body portion and actuated by movement of said element in the opposite direction into engagement with said carrier for preventing upward movement thereof, said connections being also arranged to prevent actuation of said element in said opposite direction without lowering said post.

8. In a balancing machine the combination of a body portion, a fulcrum post carried by said body portion, extending substantially vertically therefrom, and supported for vertical movement relatively thereto, actuating means for causing such vertical movement of said post, a work carrier fulcrumed on said post and constituted to receive a work piece to be balanced, locking means engageable between said body portion and said work carrier and arranged to prevent upward movement of said carrier when so engaged, and connections from said actuating means arranged to so engage said locking means upon downward movement of said fulcrum post.

JOHN L. TAYLOR.